UNITED STATES PATENT OFFICE.

CHARLES J. F. R. DE JANNEL MENARD, VICOMTE DE VAURÉAL, OF BIARRITZ, AND HENRI J. E. HENNEBUTTE, OF ANGLET, ASSIGNORS TO THE SOCIETE ANONYME DES PRODUITS CHIMIQUES DU SUD-OUEST, OF PARIS, FRANCE.

MANUFACTURE OF FERTILIZERS.

SPECIFICATION forming part of Letters Patent No. 280,320, dated June 26, 1883.

Application filed December 1, 1881. (No specimens.) Patented in France June 19, 1879, No. 131,303; in Luxembourg March, 1880, No. 125; in England July 16, 1880, No. 2,930; in Spain August, 1880, No. 939; in Italy September, 1880, No. 12,071, and in Austria September, 1880, No. 24,412.

*To all whom it may concern:*

Be it known that we, CHARLES JUST FÉLIX RAOUL DE JANNEL MENARD, VICOMTE DE VAURÉAL, and HENRI JOSEPH ERNEST HENNEBUTTE, citizens of the Republic of France, residing, the former at Biarritz, the latter at Anglet, in the Department of the Basses-Pyrénées and Republic of France, have invented new and useful Improvements in Method of Manufacturing Fertilizers, of which the following is a specification.

This invention relates to a method of manufacturing fertilizers from sewage and other waste liquids, which consists in agitating or mixing the same with chloride or sulphate of zinc and with a salt of alumina, then filtering the precipitate and drying the same in the form of cakes to be used for fertilizing purposes. The precipitation of the heavy matter of sewage and other waste liquids is very easy; but the difficulty lies in obtaining a precipitate of sufficiently slight plasticity to allow rapid and easy filtration, as a thick and plastic precipitate would obstruct and render the operation very laborious. A series of trials has shown that the most satisfactory result is obtained by first deodorizing the mass; second, attacking the fatty materials and that series of products to which the sewages owe their viscosity; and, third, combining the heavy matter held in suspension. The treatment of the fatty materials, however, can be dispensed with, if the viscosity is destroyed, by very vigorously attacking those products which hold the nitrogenous matter in suspension.

It is also best, in carrying out this process, to use cheap reagents, and a small quantity of which possess considerable energy. The method which has appeared best to us, because it furnishes a satisfactory manure and allows the filtrations to be carried out easily and quickly, is the following:

First. Deodorizing the mass and attacking the fatty and viscous matters by chloride of zinc, readily obtained by dissolving waste scraps of this metal in muriatic acid, or, in place of chlorides of zinc, by the sulphate of zinc. The chloride of zinc is here specifically mentioned; but of course any cheap metallic chloride that accomplishes a like result in an analogous manner will be the chemical equivalent of chloride of zinc.

Second. More thoroughly attacking and combining the heavy matter by means of a salt of alumina, preferably impure sulphate in a quantity of about five-thousandths. The salt of alumina is only added after the whole mass has been completely deodorized, being used in solution.

By the use of the above-named reagents a precipitate is secured that is susceptible of a rapid and easy filtration, and the residue being dried, a rich nitrogenous manure is thereby obtained from sewage and other waste liquids.

As regards the first step in the treatment of the sewage by the reagents sulphate of zinc or chloride of zinc, the same is to accomplish three results. First, it deodorizes the mass; second, it attacks the fatty and viscous matters; third, it combines in a certain measure with the nitrogenous matter, of which it modifies the molecular condition. Thus, after addition of this reagent, the heavy nitrogenous matter takes the characteristic aspect of small sponges immersed in the liquid. The sulphate of zinc should preferably be employed in solution of 18° Baumé, such as it is when obtained directly by the attack of zinc by a sulphuric solution of the strength of one-tenth of sulphuric acid. This solution gages about fourteen per cent. of sulphate of zinc. To a cubic meter of sewage is added on an average, and thoroughly mixed, fifteen kilograms of this solution, which makes somewhat more than two kilograms of dry sulphate of zinc. The preparation and use of the chloride of zinc are analogous to the process just set forth in regard to sulphate of zinc. The sulphate of alumina is used to complete the action of the reagents sulphate of zinc or chloride of zinc, its action being more thorough than that of the sulphate of zinc or the chloride of zinc. It thus completes the attack of the fats and combines in a certain degree with the heavy nitrogenous matter. If used alone, the sulphate of alumina would deodorize the mass, thereby setting free sulphhydric acid, which gives rise to inconvenience. Besides, with the amount required when used alone, it would disintegrate the heavy nitrogenous matter to such a degree as to render filtration very difficult. With three kilos of sulphate of alumina, at the most, to a cubic meter of sewage, the attack commenced by the sulphate of zinc is completed.

The process in detail is as follows: The sewage having added to it sulphate of zinc or chloride of zinc, the mass is agitated to secure mixing, whereupon the sulphate of alumina dissolved in a little water is added about ten minutes afterward. The agitation is then renewed, whereupon the mass is allowed to remain at rest for about fifteen minutes at the least. The solid matter of the sewage is precipitated at about the expiration of the time mentioned.

By our process, to treat the entire mass of sewage of about twenty-five kilos heavy nitrogenous matter to a cubic meter, it suffices to take, first, about fifteen kilos sulphate of zinc or chloride of zinc—that is, about two kilos of dry sulphate or chloride—and, second, about three kilos sulphate of alumina—that is, about three kilos dry sulphate—being in all about five kilos of dry reagent. The cakes thus obtained inclose only sixteen to seventeen per cent. inert matter, and their nitrogenous contents is never less than four per cent., and often may reach five and a half per cent. with rich sewage. These cakes are obtained either from the settlement of the precipitate on the bottom of the filter, or, if desired in smaller form, this precipitate may be cut up into small cakes with a trowel or other suitable instrument.

By our process, in the cakes obtained the nitrogen is completely fixed and there is a rich supply of nitrogen, and also the filtration or the separation of the heavy matter and liquids is very easy, and the cakes form in the filters without expenditure of mechanical force, and very little care or labor is required.

Having thus described our invention, what we claim is—

The herein-described method of manufacturing fertilizers or manure from sewage or waste liquids, which consists in agitating or mixing the same with chloride or sulphate of zinc and subsequently with a salt of alumina, and then filtering and drying the residue, substantially as described.

In testimony whereof we have hereunto set our hands and seals in the presence of two subscribing witnesses.

CHARLES JUST FÉLIX RAOUL DE JANNEL MENARD,
   VICOMTE DE VAURÉAL. [L. S.]
HENRI JOSEPH ERNEST HENNEBUTTE. [L. S.]

Witnesses:
   RENÉ FRANCK,
   ELYSEE LEAU.